Patented Nov. 26, 1935

2,022,464

UNITED STATES PATENT OFFICE 2,022,464

VITAMIN CONCENTRATE

Lloyd A. Hall, Chicago, Ill., assignor of one-half to Carroll L. Griffith

No Drawing. Application February 17, 1933, Serial No. 657,311

3 Claims. (Cl. 167—81)

This invention relates to a process of incorporating vitamin concentrates having an oil base into food products and particularly to the emulsification of vitamin concentrates.

Vitamin concentrates having an oil base and either synthetic or extracted from natural sources, have been sold previously. The oil base may be cottonseed, corn, coconut or other edible oil, or it may be naturally occurring fish oils such as cod, salmon or halibut liver oils. In this form the incorporation of such concentrates in food products is not entirely satisfactory, because the oil base of the concentrate makes uniform mixing throughout the food product difficult.

By means of this invention vitamin concentrates, particularly those containing vitamin D or vitamin A, are prepared which may be incorporated readily in food products where such concentrates will be useful, for example: bread, milk, butter, margarine, cheese, ice cream, salad dressings, cereals and other food products. In accordance with this invention the oil base vitamin concentrate is emulsified to produce a product which is very palatable as a food or medicine and which may easily and uniformly be incorporated into food products.

The emulsion may be prepared by using an emulsifying agent such as gum acacia, gum tragacanth, India or Karaya gum, gelatin, pectin, starch paste, Irish moss, agar agar, casein, egg yolk or albumin. The emulsifying agent is mixed with the oil base vitamin concentrate, and its hydrogen ion concentration is so adjusted that the value for the finished emulsion will be pH 5.5 to 6.0, by adding water containing in solution a mild alkali such as sodium bicarbonate or a weak acid such as citric or acetic acid, according to whether the original pH is above or below the desired range.

For example an emulsion may be made by adding to one quart of oil base vitamin concentrate (for example irradiated ergosterol or a powerful cod liver oil extract) 7 ounces of gum acacia, 1 ounce of gum tragacanth and 1 quart of water containing sodium bicarbonate in an amount sufficient to adjust the pH to 5.5 to 6. The emulsion is prepared by placing the gums in a dry mixing receptacle and pouring the vitamin concentrate upon them while mixing it with the gums, for example by a mechanical agitator. The sodium bicarbonate solution is then prepared and one pint is added to the gum-vitamin mixture separately, and while rapid agitation is taking place. The mixture is then stirred and beaten until it has assumed a smooth consistency, after which the remainder of the water solution is added and the mixing continued briskly for 30 minutes. It is desirable, however, to cease mixing about 4 times during this interval, for about 2 minutes at each time. That is, the 30 minutes should be divided into periods of about 7½ minutes of beating with 2 minutes intermission before the next beating.

The pH of the mixture is then tested and additional soda or a weak acid solution is then carefully mixed in to adjust the pH value to 5.5 to 6.0. After the product has stood for one hour it is preferred to gently stir it for a few minutes and then run it through a colloid mill to further perfect the emulsion by more minute disintegration and colloidizing of the oil globules.

If it is desired to use the emulsion directly for internal administration either as a medicine or as a material part of a food, suitable essential flavoring matter such as orange, lemon, lime, strawberry, pineapple, or cherry flavoring oils may be added in the form of a syrup to replace part of the water. If it likewise is desired, a suitable color may be dissolved in part of the water to produce a product of a desired color.

For example, in the preceding mixture 1 pint of the quart of water may be replaced by 1 pint of ordinary syrup (32° Baumé), 2 ounces of cold pressed California orange oil, $\frac{1}{16}$ ounce certified Sunset yellow color and $\frac{1}{16}$ gram of certified Ponceau 3R.

It is preferred to use the uncolored and unflavored emulsion for incorporation into food products. It mixes smoothly and uniformly in the manufacture of bread, milk, ice cream, butter, peanut butter, margarine, salad dressings, cheese, and the like, and does not produce a noticeable flavor or odor. For example in bread, the emulsion may be mixed with the water and then added to the dough, whereas with former vitamin concentrates it was necessary to incorporate them in the shortening which was unsatisfactory and not efficient.

In the case of ice cream or butter, the vitamin concentrate may be mixed thoroughly with the cream or milk and thereafter the regular process of manufacture followed. The vitamin concentrate is readily incorporated in milk or cream simply by mixing.

It is preferred to use a vitamin concentrate containing 6,000 A. D. M. A. (American Drug Manufacturers) units per gram. A vitamin concentrate of this strength will produce an emulsion from 20–40 times more potent than cod liver oil. Synthetic vitamin concentrates in vegetable oil bases may also be used when desired.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. As a composition of matter, an emulsified vitamin D concentrate, said emulsion containing 2700 A. D. M. A. units per gram, said emulsion containing as emulsifying agents approximately 1 part of gum tragacanth to 7 parts of gum acacia, said emulsion having a pH of 5.5 to 6.0.

2. As a composition of matter, an emulsified vitamin D concentrate, containing approximately 32 parts of vitamin concentrate having a strength of approximately 6,000 A. D. M. A. units per gram, 327 parts of aqueous fluid, 7 parts of gum acacia, 1 part of gum tragacanth and hydrogen ion modifying constituent to produce a pH of 5.5 to 6.0.

3. As a composition of matter a smooth stable, high viscosity emulsion of vitamin D concentrate, said emulsion containing 2700 A. D. M. A. units per gram, having a pH of 5.5 to 6.0, and containing as emulsifying agents a minor proportion of gum tragacanth and a major proportion of gum acacia, the minor proportion of gum tragacanth being sufficiently large, when combined with the major proportion of gum acacia, to produce a smooth stable emulsion.

LLOYD A. HALL.